US012566301B2

(12) United States Patent
Hsu et al.

(10) Patent No.: US 12,566,301 B2
(45) Date of Patent: Mar. 3, 2026

(54) OPTICAL FIBER CONNECTOR

(71) Applicant: Gloriole Electroptic Technology Corp., Kaohsiung City (TW)

(72) Inventors: Hsien-Hsin Hsu, Kaohsiung City (TW); Yu-Cheng Chen, Kaohsiung City (TW); Yen-Chang Lee, Kaohsiung City (TW)

(73) Assignee: GLORIOLE ELECTROPTIC TECHNOLOGY CORP., Kaohsiung City (TW)

( * ) Notice: Subject to any disclaimer, the term of this patent is extended or adjusted under 35 U.S.C. 154(b) by 310 days.

(21) Appl. No.: 18/541,334

(22) Filed: Dec. 15, 2023

(65) Prior Publication Data

US 2025/0085485 A1     Mar. 13, 2025

(30) Foreign Application Priority Data

Sep. 11, 2023     (TW) ................................. 112209784

(51) Int. Cl.
G02B 6/38          (2006.01)
(52) U.S. Cl.
CPC ................................. *G02B 6/3871* (2013.01)

(58) Field of Classification Search
CPC .................................................... G02B 6/3871
See application file for complete search history.

(56) References Cited

U.S. PATENT DOCUMENTS

| | | | | |
|---|---|---|---|---|
| 5,082,344 A | * | 1/1992 | Mulholland | ......... G02B 6/3835 |
| | | | | 385/60 |
| 2014/0064665 A1 | * | 3/2014 | Ott | ....................... G02B 6/3825 |
| | | | | 385/60 |

* cited by examiner

*Primary Examiner* — Chad H Smith
(74) *Attorney, Agent, or Firm* — MUNCY, GEISSLER, OLDS & LOWE, P.C.

(57)          ABSTRACT

An optical fiber connector includes a fastener member threadedly connected to a main housing. A resilient member is received in the main housing and the fastener member, and abuts against the fastener member. A rotatable tube seat is sleeved by the resilient member, and is positioned by the main housing and the resilient member. A turning member is sleeved on the rotatable tube seat, and is sleeved by the fastener member. The rotatable tube seat is co-rotatable with the turning member. When the fastener member is loosened from the main housing, the turning member is rotatable relative to the fastener member to drive rotation of the rotatable tube seat relative to the main housing.

7 Claims, 5 Drawing Sheets

OPTICAL FIBER CONNECTOR

CROSS-REFERENCE TO RELATED APPLICATION

This application claims priority to Taiwanese Utility Model Patent Application No. 112209784, filed on Sep. 11, 2023, the entire disclosure of which is incorporated by reference herein.

FIELD

The disclosure relates to a connector, and more particularly to an optical fiber connector.

BACKGROUND

FIG. 1 shows a polarization-maintaining optical fiber 1 that may maintain consistent polarization state of incident light rays and that differs from a conventional optical fiber which transmits light rays polarized in random directions. The polarization-maintaining optical fiber 1 has two stress rods 11 and a fiber core 12 located on a central axial line of the polarization-maintaining optical fiber 1. The two stress rods 11 are respectively disposed on two opposite sides of the fiber core 12. The two stress rods 11 generate stress forces in a predetermined direction such that the polarization-maintaining optical fiber 1 may maintain the polarization state of the incident light rays. However, when the polarization-maintaining optical fiber 1 is installed to an optical fiber connector 13, manufacturing tolerances or installation errors may cause twist and misalignment of the polarization-maintaining optical fiber 1, thereby resulting in problems such as long-distance transmission latency and signal errors during high-speed signal transmission.

SUMMARY

Therefore, an object of the disclosure is to provide an optical fiber connector that can alleviate at least one of the drawbacks of the prior art.

According to the disclosure, an optical fiber connector includes a main housing, a fastener member, a resilient member, a rotatable tube seat, and a turning member.

The fastener member is threadedly connected to a rear end portion of the main housing.

The resilient member is received in the main housing and the fastener member, and has a rear end abutting against the fastener member.

The rotatable tube seat is sleeved by the resilient member and abuts against a front end of the resilient member. The rotatable tube seat is positioned by the main housing and the resilient member in a front-rear direction.

The turning member is sleeved on the rotatable tube seat, and is sleeved by the fastener member. The rotatable tube seat is co-rotatable with the turning member.

When the fastener member is loosened from the main housing, the turning member is rotatable relative to the fastener member to drive rotation of the rotatable tube seat relative to the main housing.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
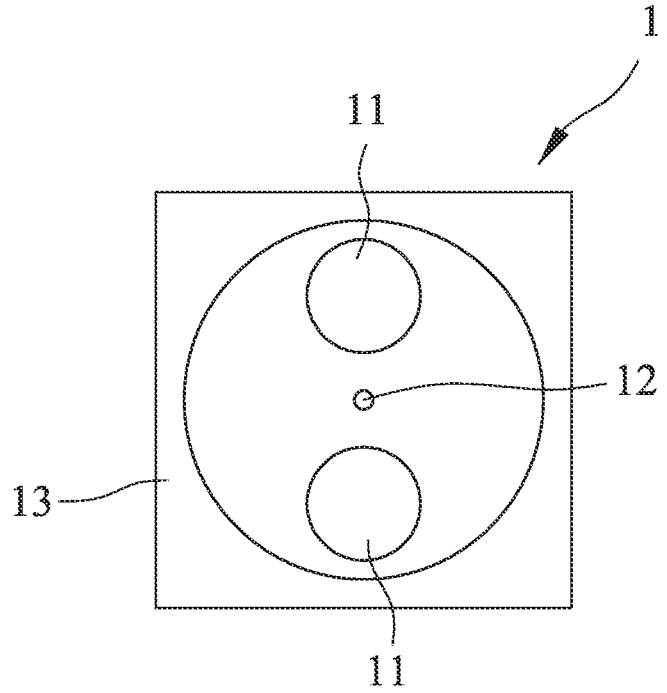
FIG. 1 is a schematic view illustrating a conventional polarization-maintaining optical fiber.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
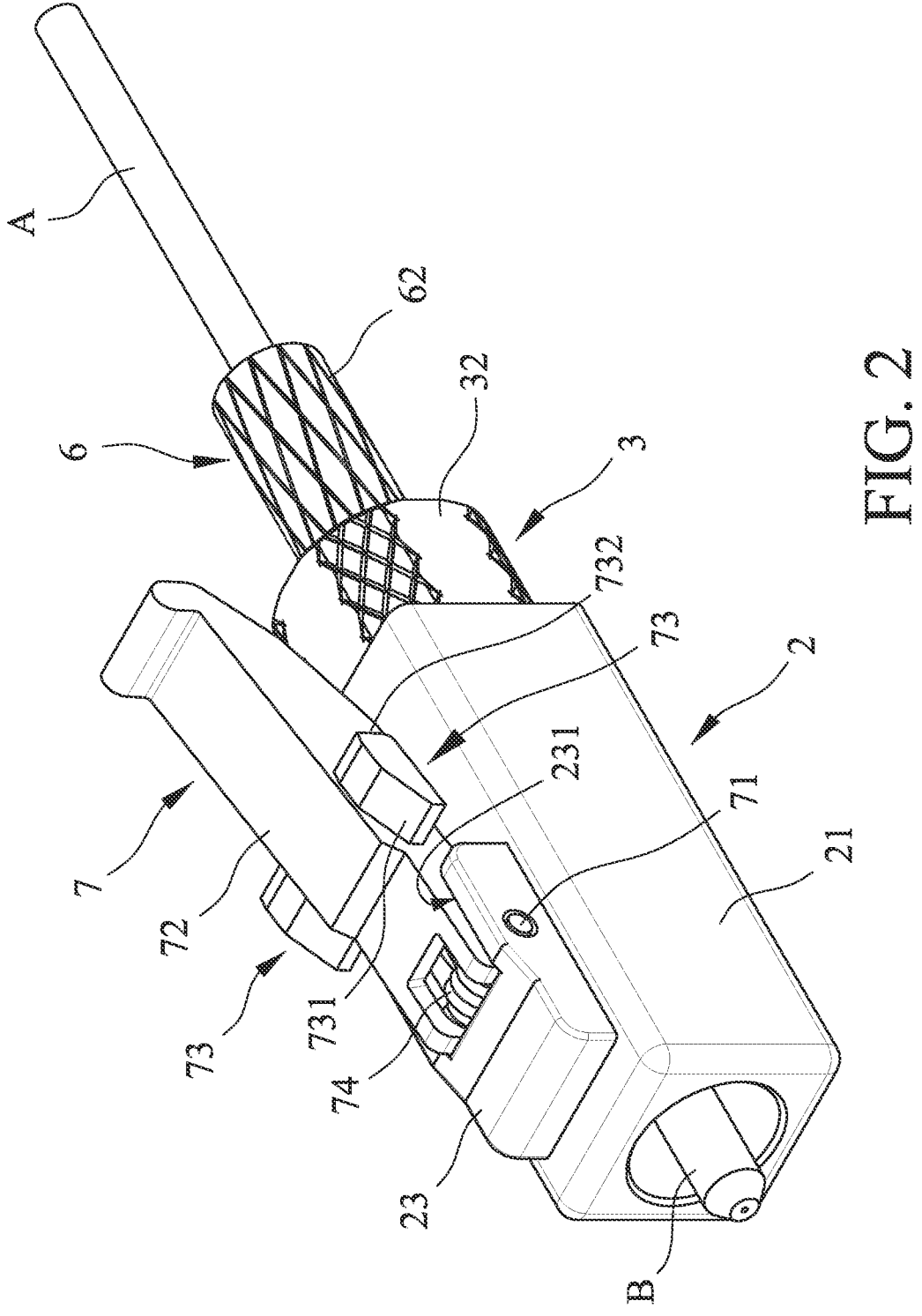
FIG. 2 is a partly perspective view illustrating an optical fiber connector according an embodiment of the disclosure assembled with a ferrule and an optical fiber.
Figure 3:
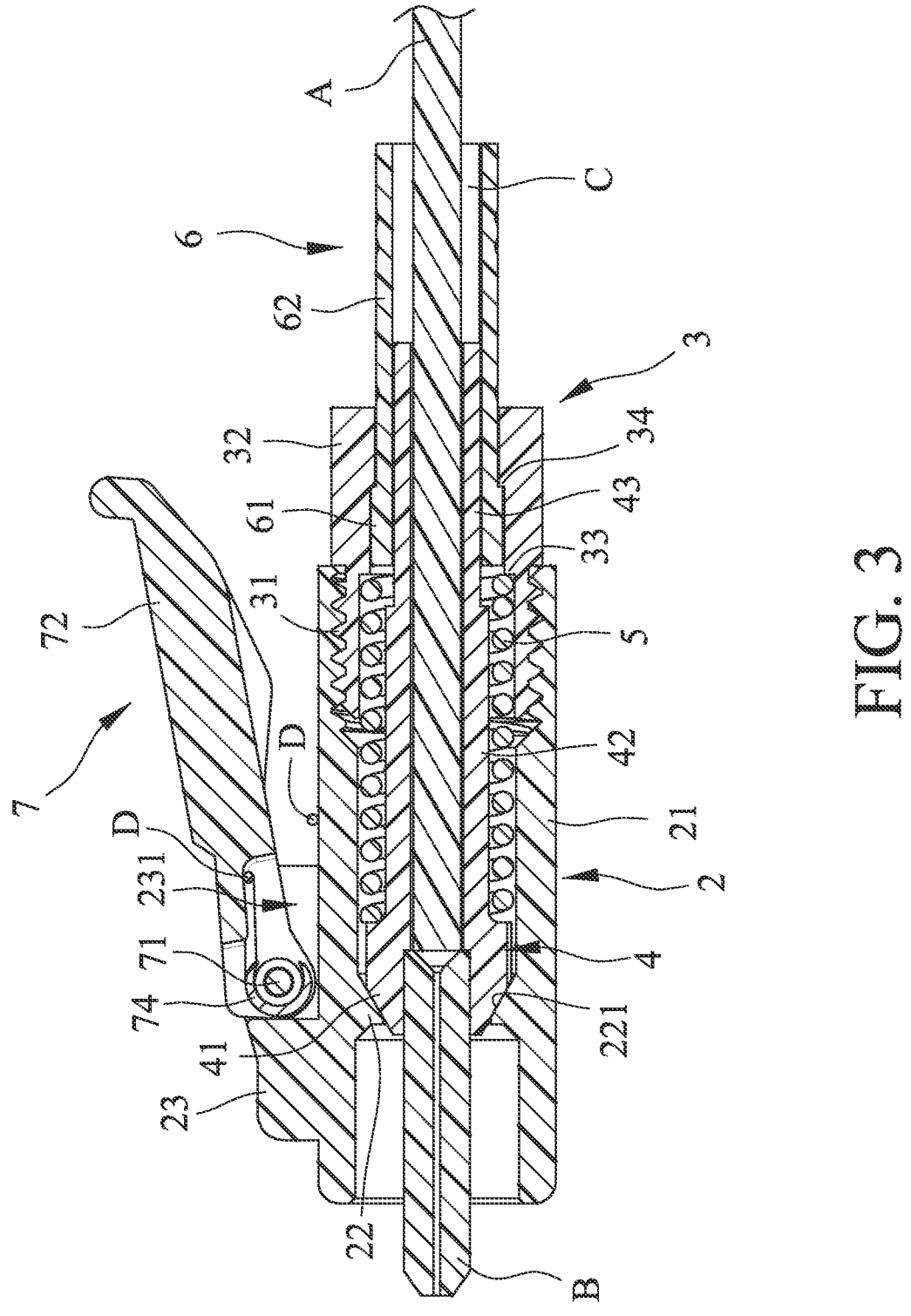
FIG. 3 is a fragmentary sectional view of the embodiment of the disclosure.

FIGS. 2 and 3 illustrate an optical fiber connector according to an embodiment of the disclosure adapted for insertion of an optical fiber (A) and a ferrule (B). The optical fiber connector includes a main housing 2, a fastener member 3, a resilient member 5, a rotatable tube seat 4, a turning member 6, and a press member 7. The main housing 2, the fastener member 3, the resilient member 5, the rotatable tube seat 4, and the turning member 6 are coaxial.

The main housing 2 has an outer surrounding wall 21, an abutment wall portion 22, and a protrusion portion 23. The outer surrounding wall 21 surrounds the rotatable tube seat 4 and the resilient member 5, and is threadedly connected to the fastener member 3. The fastener member 3, the resilient member 5, and the rotatable tube seat 4 will be described hereinafter in details. The abutment wall portion 22 protrudes inwardly from an inner surrounding surface of the outer surrounding wall 21, and has a conical surface 221 that faces rearwardly. The protrusion portion 23 protrudes from an outer surface of the outer surrounding wall 21, and has a recess 231 that is formed at a rear end thereof.

The fastener member 3 is threadedly connected to a rear end portion of the main housing 2. In this embodiment, the outer surrounding wall 21 has a rear end portion serving as the rear end portion of the main housing 2. The fastener member 3 has a threaded portion 31, an adjusting portion 32, a first retaining portion 33, and a second retaining portion 34. The threaded portion 31 is threadedly connected to the rear end portion of the outer surrounding wall 21. The adjusting portion 32 extends rearwardly from the threaded portion 31 and outwardly of the main housing 2, and is annular. The first retaining portion 33 protrudes inwardly from an inner surrounding surface of the adjusting portion 32. The second retaining portion 34 protrudes inwardly from the inner surrounding surface of the adjusting portion 32 and is disposed rearwardly of the first retaining portion 33. An inner diameter of the first retaining portion 33 is greater than an inner diameter of the second retaining portion 34.

The resilient member 5 is received in the main housing 2 and the fastener member 3, and has a rear end abutting against the fastener member 3.

Figure 4:
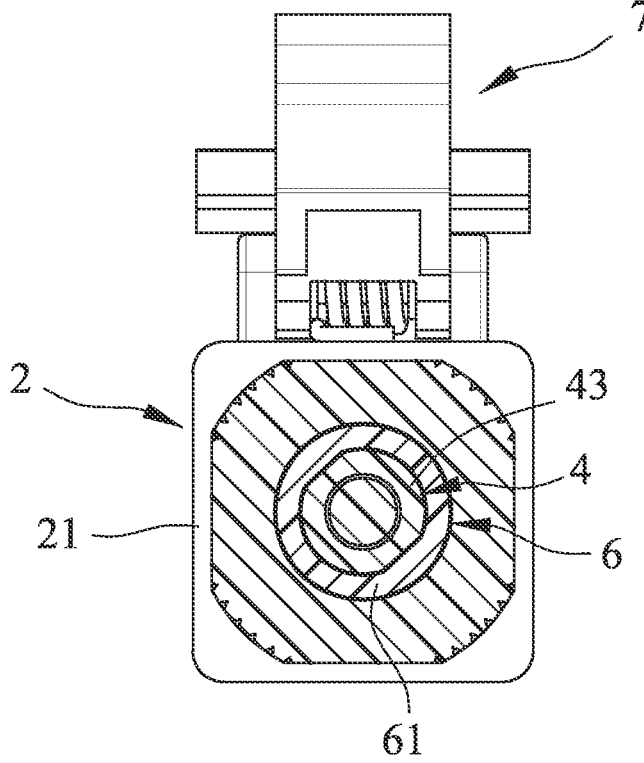
FIG. 4 is a partly sectional rear view of the embodiment of the disclosure.

Referring to FIG. 4 in combination with FIG. 3, the rotatable tube seat 4 is sleeved by the resilient member 5 and abuts against a front end of the resilient member 5. The rotatable tube seat 4 is positioned by the main housing 2 and the resilient member 5 in a front-rear direction. In this embodiment, the rotatable tube seat 4 has a limiting end portion 41, a tube portion 42, and a coupling portion 43. The limiting end portion 41 is clamped between the abutment wall portion 22 of the main housing 2 and the front end of the resilient member 5. The conical surface 221 of the abutment wall portion 22 abuts against a front end of the limiting end portion 41. The tube portion 42 extends rearwardly from the limiting end portion 41 into the threaded portion 31 of the fastener member 3, and is sleeved by the resilient member 5. An outer diameter of the tube portion 42 is smaller than an outer diameter of the limiting end portion 41. The coupling portion 43 is non-circular and extends rearwardly from the tube portion 42. The coupling portion 43 extends outwardly of the adjusting portion 32. The outer diameter of the tube portion 42 is greater than an outer diameter of the coupling portion 43. As shown in FIG. 3, the resilient member 5 is sleeved on the tube portion 42. The resilient member 5 is positioned between the limiting end portion 41 of the rotatable tube seat 4 and the first retaining portion 33 of the fastener member 3 in a manner such that the front end and the rear end of the resilient member 5 respectively abut against the limiting end portion 41 and the first retaining portion 33.

The turning member 6 is sleeved on the rotatable tube seat 4, and is sleeved by the fastener member 3. The rotatable tube seat 4 is co-rotatable with the turning member 6. In this embodiment, the turning member 6 has a positioning portion 61 and an operative portion 62. The positioning portion 61 is sleeved on the coupling portion 43, and is positioned between the resilient member 5 and the second retaining portion 34 of the fastener member 3. An inner diameter of the positioning portion 61 is smaller than the outer diameter of the tube portion 42. The operative portion 62 extends rearwardly from the positioning portion 61. The operative portion 62 of the turning member 6 extends rearwardly through the second retaining portion 34 of the fastener member 3 and outwardly of the adjusting portion 32.

Figure 5:
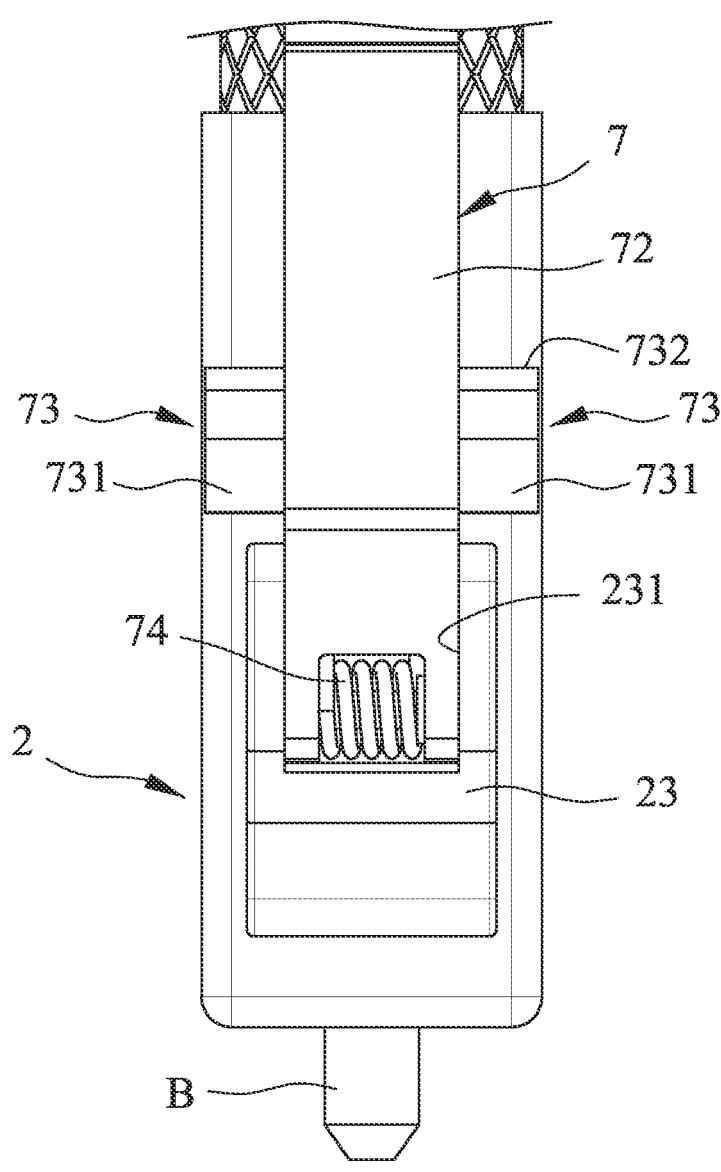
FIG. 5 is a fragmentary top view of the embodiment of the disclosure.

As shown in FIGS. 2, 3, and 5, the press member 7 is pivotally connected to the protrusion portion 23 and is resiliently pressable to move toward the outer surface of the outer surrounding wall 21. The press member 7 has a press body 72, a pivot pin 71, two engaging members 73, and a torsion spring 74. The press body 72 has an end portion disposed in the recess 231 and a free end portion inclined rearwardly from the end portion thereof. The pivot pin 71 extends through the end portion of the press body 72 and the protrusion portion 23 via the recess 231. The two engaging members 73 protrude respectively from two opposite lateral sides of the press body 72 in opposite directions. The torsion spring 74 is sleeved on the pivot pin 71, is disposed in the recess 231, and has two ends (D) respectively abutting against the outer surrounding wall 21 and the press body 72. In this embodiment, each of the two engaging members 73 is configured to have a cross section that is non-isosceles trapezoid shaped, and has an inclined surface 731 and an engaging surface 732. The inclined surface 731 is forwardly oriented. The engaging surface 732 is rearwardly oriented.

The press body 72 and the two engaging members 73 may be made from a metal material, such as a titanium material.

When the optical fiber connector of the disclosure is inserted into an adapter (not shown), because the inclined surfaces 731 of the two engaging members 73 are pressed by a pressing structure of the adapter to drive rotation of the press body 72 about the pivot pin 71, the free end of the press body 72 is moved adjacent to the outer surface of the outer surrounding wall 21, and the torsion spring 74 is driven to store a resilient force. As long as the inclined surfaces 731 are no longer pressed after the two engaging members 73 completely pass through the pressing structure of the adapter, the resilient force of the torsion spring 74 biases the free end of the press body 72 to move away from the outer surface of the outer surrounding wall 21. Meanwhile, because the engaging surfaces 732 of the two engaging members 73 abut against the adapter in the front-rear direction, the two engaging members 73 engage with the adapter. To remove the optical fiber connector of the disclosure from the adapter, the free end of the press body 72 is pressed such that the engaging surfaces 732 of the two engaging members 73 are detached from the adapter, thereby removing the optical fiber connector of the disclosure from the adapter.

In general, a press button of an existing optical fiber connector is flexibly and integrally formed with a main connector body of the existing optical fiber connector. However, due to frequent operation of the press button, the press button tends to experience fatigue and may become no longer restorable. In some cases, frequently operating the press button may cause a junction of the press button and the main connector body to be broken. In contrast, because the press member 7 is pivotally connected to the protrusion portion 23 of the main housing 2, and because the press body 72 is made from the metal material, the press member 7 may avoid being broken, and the press body 72 may withstand such frequent operation. Additionally, by virtue of the resilient force of the torsion spring 74, the press body 72 may be easily restored.

The tube portion 42 and the coupling portion 43 of the rotatable tube seat 4 are adapted for insertion of the optical fiber (A). The front end of the limiting end portion 41 is adapted for insertion of the ferrule (B). To adjust a rotation angle of the optical fiber (A), generally with respect to the protrusion portion 23 of the main housing 2, the adjusting portion 32 of the fastener member 3 is first rotated. When the adjusting portion 32 of the fastener member 3 is loosened from the main housing 2, a distance between the first retaining portion 33 of the fastener member 3 and the limiting end portion 41 of the rotatable tube seat 4 is increased, thereby alleviating compression of the resilient member 5 between the limiting end portion 41 and the first retaining portion 33 such that a resilient force of the resilient member 5 is reduced to lessen the abutment of the limiting end portion 41 against the abutment wall portion 22. The operative portion 62 of the turning member 6 may be directly rotated by a user to make the turning member 6 rotate relative to the fastener member 3. By virtue of rotation of the turning member 6, the coupling portion 43 of the rotatable tube seat 4 is rotated together with the positioning portion 61 of the turning member 6 so that the rotatable tube seat 4 is rotated relative to the main housing 2 for adjusting the rotation angle of the optical fiber (A). After adjustment of the rotation angle of the optical fiber (A) is completed, the resilient member 5 may be compressed by tightening the adjusting portion 32 of the fastener member 3 so that the resilient member 5 may force the limiting end portion 41 to abut against the abutment wall portion 22. Due to a frictional force generated between the limiting end portion 41 and the abutment wall portion 22, the rotatable tube seat 4 is prevented from rotating relative to the main housing 2. In addition, the coupling portion 43 of the rotatable tube seat 4, the operative portion 62 of the turning member 6, and the optical fiber (A) cooperatively define a space (C) in which Kevlar® filaments (not shown) are disposed. By crimping a rear end of the operative portion 62, the optical fiber (A) and the turning member 6 are combined with each other to resist a kink.

In summary, without using a tool, the optical fiber connector of the disclosure may be instantly and conveniently used to adjust the rotation angle of the optical fiber (A), and ripping of the optical fiber (A) during the adjustment of the rotation angle of the optical fiber (A) may be avoided.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," "an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An optical fiber connector comprising:
a main housing;
a fastener member that is threadedly connected to a rear end portion of said main housing;
a resilient member that is received in said main housing and said fastener member, and that has a rear end abutting against said fastener member;
a rotatable tube seat that is sleeved by said resilient member and that abuts against a front end of said resilient member, said rotatable tube seat being positioned by said main housing and said resilient member in a front-rear direction; and
a turning member that is sleeved on said rotatable tube seat, and that is sleeved by said fastener member, said rotatable tube seat being co-rotatable with said turning member;

wherein when said fastener member is loosened from said main housing, said turning member is rotatable relative to said fastener member to drive rotation of said rotatable tube seat relative to said main housing.

2. The optical fiber connector as claimed in claim 1, wherein said rotatable tube seat has a coupling portion that is non-circular and that is sleeved by said turning member.

3. The optical fiber connector as claimed in claim 1, wherein said main housing has:
an outer surrounding wall that surrounds said rotatable tube seat and said resilient member, and that is threadedly connected to said fastener member; and
an abutment wall portion that protrudes inwardly from an inner surrounding surface of said outer surrounding wall, and that abuts against a front end of said rotatable tube seat.

4. The optical fiber connector as claimed in claim 3, wherein
said rotatable tube seat has
a limiting end portion that is clamped between said abutment wall portion of said main housing and said front end of said resilient member,
a tube portion that extends rearwardly from said limiting end portion and that is sleeved by said resilient member, and
a coupling portion that is non-circular and that extends rearwardly from said tube portion, an outer diameter of said tube portion being greater than an outer diameter of said coupling portion; and
said turning member has
a positioning portion that is sleeved on said coupling portion, and
an operative portion that extends rearwardly from said positioning portion, an inner diameter of said positioning portion being smaller than said outer diameter of said tube portion.

5. The optical fiber connector as claimed in claim 4, wherein
said fastener member has
a threaded portion that is threadedly connected to a rear end portion of said outer surrounding wall,
an adjusting portion that extends rearwardly from said threaded portion and outwardly of said main housing, and that is annular,
a first retaining portion that protrudes inwardly from an inner surrounding surface of said adjusting portion, and
a second retaining portion that protrudes inwardly from said inner surrounding surface of said adjusting portion and that is disposed rearwardly of said first retaining portion, an inner diameter of said first retaining portion being greater than an inner diameter of said second retaining portion;
said resilient member is positioned between said limiting end portion of said rotatable tube seat and said first retaining portion of said fastener member;
said positioning portion of said turning member is positioned between said resilient member and said second retaining portion of said fastener member; and
said operative portion of said turning member extends rearwardly through said second retaining portion of said fastener member.

6. The optical fiber connector as claimed in claim 3, wherein
said main housing further has a protrusion portion that protrudes from an outer surface of said outer surrounding wall; and said optical fiber connector further comprises a press member that is pivotally connected to said protrusion portion and that is resiliently pressable to move toward said outer surface of said outer surrounding wall.

7. The optical fiber connector as claimed in claim 6, wherein said protrusion portion has a recess that is formed at a rear end thereof;

said press member has a press body that has an end portion disposed in said recess and a free end portion inclined rearwardly from said end portion, a pivot pin that extends through said end portion of said press body and said protrusion portion via said recess, two engaging members that protrude respectively from two opposite lateral sides of said press body in opposite directions, and a torsion spring that is sleeved on said pivot pin, that is disposed in said recess, and that has two ends respectively abutting against said outer surrounding wall and said press body; and each of said engaging members has an inclined surface that is forwardly oriented and an engaging surface that is rearwardly oriented.

\* \* \* \* \*